US 009653116 B2

(12) United States Patent
Paulraj et al.

(10) Patent No.: US 9,653,116 B2
(45) Date of Patent: May 16, 2017

(54) VIDEO PIN SHARING (71) Applicant: Apollo Group, Inc., Phoenix, AZ (US)

(72) Inventors: Prince Paulraj, Fremont, CA (US); Dipti Srivastava, Saraoga, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 724 days.

(21) Appl. No.: 13/829,814

(22) Filed: Mar. 14, 2013

(65) Prior Publication Data
US 2014/0281996 A1    Sep. 18, 2014

(51) Int. Cl.
*G11B 27/11*    (2006.01)

(52) U.S. Cl.
CPC .................. *G11B 27/11* (2013.01)

(58) Field of Classification Search
CPC ............... G06F 3/0484; G06F 17/241; G06F 17/30525; G06F 17/30882; G06F 17/30817; G06F 17/30837; G06F 17/30017; G06F 3/04842; G06F 3/04845; G06F 17/30056; G06F 9/44526; H04L 51/10; H04L 65/1023; H04L 65/60; H04L 41/22; H04N 21/4316; H04N 21/472; H04N 7/147; H04N 21/47205; H04N 21/47217
USPC ........ 715/720, 230, 233, 512, 716, 719, 723
See application file for complete search history.

(56) References Cited

U.S. PATENT DOCUMENTS

| | | | |
|---|---|---|---|
| 8,457,468 B2 | 6/2013 | Chen et al. | |
| 2002/0120925 A1* | 8/2002 | Logan | A23L 1/3002 725/9 |
| 2003/0220973 A1* | 11/2003 | Zhu et al. | 709/205 |
| 2005/0166258 A1* | 7/2005 | Vasilevsky | G11B 27/00 725/138 |
| 2006/0184673 A1* | 8/2006 | Liebman | 709/225 |
| 2007/0189708 A1* | 8/2007 | Lerman et al. | 386/52 |
| 2008/0154908 A1 | 6/2008 | Datar et al. | |
| 2008/0288913 A1* | 11/2008 | Creighton et al. | 717/100 |
| 2008/0313541 A1* | 12/2008 | Shafton et al. | 715/725 |
| 2008/0313570 A1* | 12/2008 | Shamma et al. | 715/846 |
| 2009/0119592 A1* | 5/2009 | Boerner | G06F 17/30053 715/716 |
| 2010/0027966 A1* | 2/2010 | Harrang | H04N 5/775 386/241 |
| 2010/0178031 A1* | 7/2010 | Kim | H04N 5/76 386/291 |
| 2011/0258545 A1 | 10/2011 | Hunter | |
| 2011/0301433 A1* | 12/2011 | Sadowsky et al. | 600/300 |

(Continued)

*Primary Examiner* — Jeffrey A Gaffin
*Assistant Examiner* — Mandrita Brahmachari
(74) *Attorney, Agent, or Firm* — Hickman Palermo Becker Bingham LLP (57) ABSTRACT

Techniques are provided for assisting users to share specific locations within videos. Specifically, controls are provided to enable a viewer of a video to drop a "video pin" on a location within a video. In response to the user dropping a video pin at a particular location in the video, a "video pin record" that indicates the selected location is automatically generated by a video pin application. The video pins may be used to identify specific time points in the video and/or specific time segments of the video. Video pin records may be shared with other users to allow the other users to immediately jump to the locations, within the video, at which the corresponding video pins were dropped.

30 Claims, 3 Drawing Sheets

(56) References Cited

U.S. PATENT DOCUMENTS

| | | | |
|---|---|---|---|
| 2012/0023407 A1* | 1/2012 | Taylor | G06F 9/4443 715/731 |
| 2012/0131002 A1 | 5/2012 | Rakshit | |
| 2012/0246685 A1 | 9/2012 | Fink et al. | |
| 2013/0051757 A1* | 2/2013 | Shahraray | G06F 17/30884 386/241 |
| 2013/0067333 A1 | 3/2013 | Brenneman | |
| 2013/0145269 A1* | 6/2013 | Latulipe et al. | 715/720 |

* cited by examiner

VIDEO PIN SHARING

FIELD OF THE INVENTION

The present invention relates to video and, more specifically, to techniques for sharing specific points or segments of video.

BACKGROUND

In a wide variety of contexts, video has become an extremely important way to communicate information. For example, in the context of entertainment, videos range from blockbuster movies to short amateur clips uploaded to online video services or social networks. In the context of education, both online and conventional courses may make extensive use of videos to teach relevant content. Videos can also be valuable tools in the context of business, marketing, sales, etc.

It is common for some portions of a video to be more important than others. For example, in a humorous video, the video may be funny because of an event that occurs unexpectedly at a particular point in the video, but may be otherwise unremarkable. In the context of a sports video, the video may be exciting before the scoring of each point, but may be otherwise boring. In the context of education, the segments in which key points are explained may be considered more important than other parts of the video.

When people share and/or comment on a video, they often try to communicate to others the portion of the video that they consider to be most interesting. Typically, this involves manually determining the time-offset, from the start of the video, at which the interesting segment begins, and communicating that time-offset to others. For example, while watching a humorous video, a user may think a particular event within the video is particularly funny. To determine the offset at which the event begins, the user may manipulate a timeline control of the video player to back the player up to the start of the interesting event. Once the timeline control is backed up to the start of the interesting event, the user may make a note of the time offset displayed by the video player. For example, the user may make a note that the funny event starts exactly 3 minutes and 12 seconds into a five minute video.

Once a user makes a note of the time offset of the interesting event, the user may send or post a message, about the video, that mentions the time offset. For example, the user may post a comment about the video, where the comment says "You have to see what happens at 3:12". Based on this comment, subsequent viewers of the video may be encouraged to keep watching the video until the event occurs at 3:12, or may even be tempted to jump the video player ahead to the timeline position for 3:12, to skip over the less-interesting material.

Using these conventional techniques, communicating the time of interesting events, within a video, is both cumbersome and error prone. For example, the person giving the recommendation typically has to rewind/fast forward the video to the relevant event, and then write down (or memorize) the time offset shown by the player. Then the user has to send a message or post a comment with the time offset. When others attempt to manually fast forward to the location associated with the time offset, it is easy to overshoot or undershoot the mark. For example, with long videos, manipulating the timeline control to jump to a particular location can be quite difficult, because even small adjustments of the timeline control of a long video will cause large jumps.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for assisting users to share specific locations within videos. Rather than write down or memorize a time offset, and then communicate the offset in a message or post, users are presented with controls to facilitate the recording and sharing of information associated with specific locations within video.

In one embodiment, controls are provided to enable the viewer of a video to drop a "video pin" on a location within the video. In response to the user dropping a video pin at a particular location in the video, a "video pin record" that indicates the selected location is automatically generated by a video pin application. The video pins may be used to identify specific time points in the video and/or specific time segments of the video. Video pin records may be shared with other users to allow the other users to immediately jump to the locations, within the video, at which the corresponding video pins were dropped.

In some embodiments, multiple video pins may be dropped on a single video. The video pin records of all video pins that have been dropped on the video may be encapsulated in "a video share record" that includes both the video pin records and other metadata about the video itself. Video players may use the video metadata within the video share record to retrieve and initiate playback of a video in which pins have been dropped, and use the video pin records within the video share record to allow the user to jump immediately to any of the locations in which video pins were dropped.

Techniques are provided also provided for automatically communicating video share records to other users. In response to receiving a video share record, a video player of the recipient may be launched, either automatically or in response to user input. The launched video player, a separate application or widget, provides controls that make use of the video pin data. For example, the video player or widget may display a list of video pins, display any comments, tags or labels associated with the video pins, allow the user to add comments, tags or labels to the video pins, and allow the user to immediately jump the video playback position to the location identified by any of the video pins.

Example Interface

Figure 1:
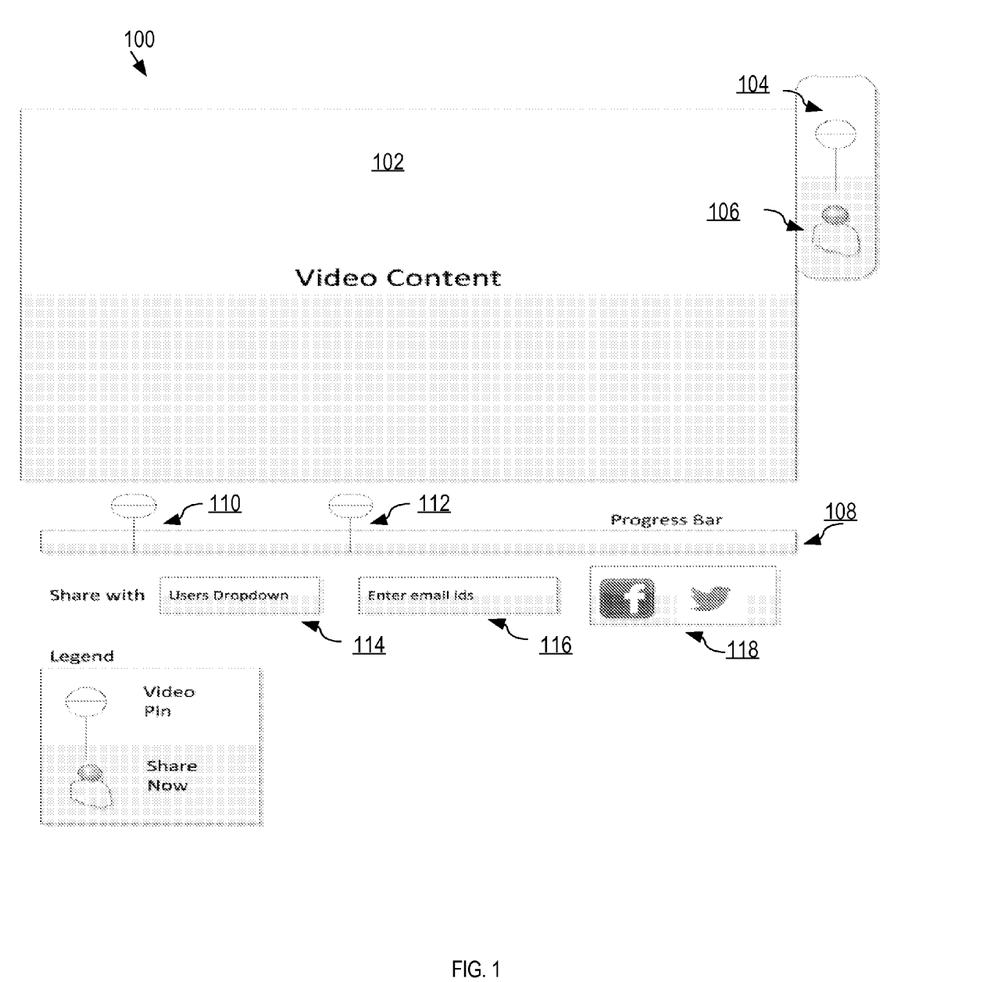
FIG. 1 is a block diagram that depicts controls for sharing video pins, according to an embodiment of the invention.

Referring to FIG. 1, it is a block diagram illustrating an interface 100 that may be used to specify video pin locations within a video, according to one embodiment. Interface 100 includes a video display region 102 in which video is displayed during playback, and a progress bar 108 that indicates the current playback position of the video relative to the total length of the video.

In addition to the video display region 102 and the progress bar 108, interface 100 also includes a video pin control 104 and a share-now control 106. Video pin control 104 is a control that allows users to identify specific points, or the boundaries of specific segments, within the video that is being displayed within video display region 102. Specifically, in the illustrated embodiment, the user selects the video pin control 104, and then selects a point on the progress bar 108. In response, a video pin indicator is displayed on the progress bar 108, and a video pin record is generated.

In the example illustrated in FIG. 1, two video pin indicators 110 and 112 are already present on progress bar. The presence of video pin indicators 110 and 112 indicates that the user has already identified two specific points within the video, and further indicates the location of those two points relative to the entire duration of the video.

It should be noted that video pin locations may be specified in any number of ways. For example, rather than select the video pin control 104 and then a location on the progress bar 108, a user may drag a video pin indicator from the video pin control 104 down onto the progress bar 108. As another example, the user may simply select the video pin control 104 while a video is being played to cause a video pin to be automatically placed at the current playback location of the video. As yet another example, a user may drag a video pin indicator from the video pin control 104 onto the video display region 102 to cause a video pin indicator to be automatically placed at the current playback location of the video. These are merely some examples of how users may indicate the locations at which to place video pins, and the techniques described herein are not limited to any specific ways of placing video pins.

In response to the placement of a video pin indicator on the progress bar 108, the video displayed in the video display region 102 may automatically jump to the location, within the video, that corresponds to the location of the video pin indicator on the progress bar 108. In the case where the progress bar 108 is generated by the video playback application, this functionality may be built in to the video playback application. However, in embodiments in which the progress bar 108 is generated by a separate program (to be discussed in greater detail below), this functionality may be accomplished by causing the separate program to make a call to an API of the video playback application to cause the video playback application to jump the video to the designated location.

Point Indicators and Segment Indicators

In the examples given above, video pins are used to identify a specific point within a video. However, sometimes it is desirable to identify a specific segment of a video, rather than a single point. According to one embodiment, a video pin control may be used to both identify specific points, and identify specific segments. For example, when a user places a video pin indicator on progress bar 108, the video pin control may prompt the user to indicate whether the video pin is a "point-in-time" pin or a "start-segment" pin. If the user indicates that the pin is a point-in-time pin, the pin is placed and the corresponding video pin record is generated.

On the other hand, if the user indicates that the video pin is a start-segment pin, then the video pin control waits for the user to place another pin on the progress bar 108. The pin placed on progress bar 108 immediately after the placement of a start-segment pin is presumed to be an end-segment pin that ends the segment that starts at the start-segment pin. In response to the placement of an end-segment pin, a video pin record is generated. However, rather than identify a single point within the video, the video pin record that is generated in response to an end-segment pin identifies a segment of the video.

Within a video pin record, a segment may be identified using either (a) the time offset that corresponds to the start-segment pin and the time offset that corresponds to the end-segment pin, or (b) the time offset that corresponds to the start-segment pin and the duration of the segment. For example, assume that video pin indicator 110 indicates the start of a segment, and video pin indicator 112 indicates the end of the segment. Assume further that video pin indicator 110 marks a location one minute into the video, while video pin indicator 112 marks a location three minutes into the video. Under these circumstances, the video pin record for the segment may indicate the boundaries of the segment (1:00, 3:00), or the start boundary with the duration (1:00, 2:00). These are merely examples of how information about a segment may be identified in a video pin record, and the techniques described herein are not limited to any particular data items.

In the interface 100 illustrated in FIG. 1, a single video pin control 104 is shown. However, in alternative embodiments, two or three controls may be provided. In an embodiment with two video pin controls, one video pin control may be used to drop "point-in-time" pins, while the other video pin control is used to drop "start-segment" and "end-segment" pins. The video pin controls, and the pins that the controls drop, may differ visually to assist the user in distinguishing between the two. For example, point-in-time video pins and controls may be a different color than the start-segment, end-segment pins. As another example, the point-in-time video pins may look like conventional pins, while start-segment pins include arrows that point to the right and end-segment pins include arrows that point to the left.

In an interface with three pin controls, each type of pin may have its own control. For example, there may be separate controls for "point-in-time" pins, "start-segment" pins and "end-segment" pins. The control with which the user interacts determines the type of video pin that is dropped on the progress bar 108.

In one embodiment, a single start-segment pin may be used to generate video pin records for multiple segments. For example, a user may place a start-segment pin at the location that corresponds to 1:00 on the progress bar 108. The user may then place three end-segment pins at locations 2:00, 2:30 and 1:30, respectively. As each end-segment pin is placed, a video pin record is generated for the segment that begins at 1:00, and ends at the location at which the end-segment pin was dropped. Thus, in the present example, video pin records would be generated for the segments (1:00, 2:00), (1:00, 2:30) and (1:00, 1:30).

Implementations of Video Pin Controls

Video playback applications may be designed with video pin controls that implement the functionality described herein. However, in alternative embodiments, the video pin controls may be implemented in software (a "video pin application") that executes independently relative to the video players. For example, a video pin application may be a widget, a separately executing desktop application, or a mobile app.

Direct access to, and manipulation of, the video data is unnecessary because the video pin records are both generated and maintained external to the video itself. Thus, the video pin application may be used equally during the playback of stored video files and the playback of streaming video. In addition, because the video pin application does not modify the video itself, the video pin application may be video format agnostic, operating without regard to the format of the video for which video pin records are generated.

In one embodiment, the progress bar 108 is generated by the same video pin application that generates the pin control 104, rather than by the video playback application that plays the video within video display region 102. Consequently, that video pin application may be designed to detect the placement of pin indicators on the progress bar 108, and to display the pin indicators once placed. The progress bar 108 may be used instead of, or in addition to, any progress bar generated by the video playback application.

In an embodiment in which the video pin application is implemented as a widget, when the widget is used in conjunction with a video playback application, the widget interacts with an API provided by the video playback application to read the duration of the video content. Based on the duration, the widget is able to establish a correlation between locations on progress bar 108, and actual time offsets into the video. For example, if the total duration of a video is 10:00, then the point exactly in the middle of the progress bar 108 corresponds to an offset of 5:00, and the point ¾ into the progress bar 108 corresponds to an offset of 7:30.

In addition to obtaining the duration of the video through the API, the widget may obtain metadata about many other characteristics of the video. For example, the widget may obtain, through the API, information about the title of the video, the format of the video, the resolution of the video, etc. As shall be described hereafter, this information may be encapsulated in a video share record that is sent to other instances of the video pin application on other devices. For example, a user may send a video share record to a friend, to allow the video pin application of the friend's device to launch a video player application to play the specified video, and to provide controls that display the previously-recorded video pins.

Operation Example

Figure 2:
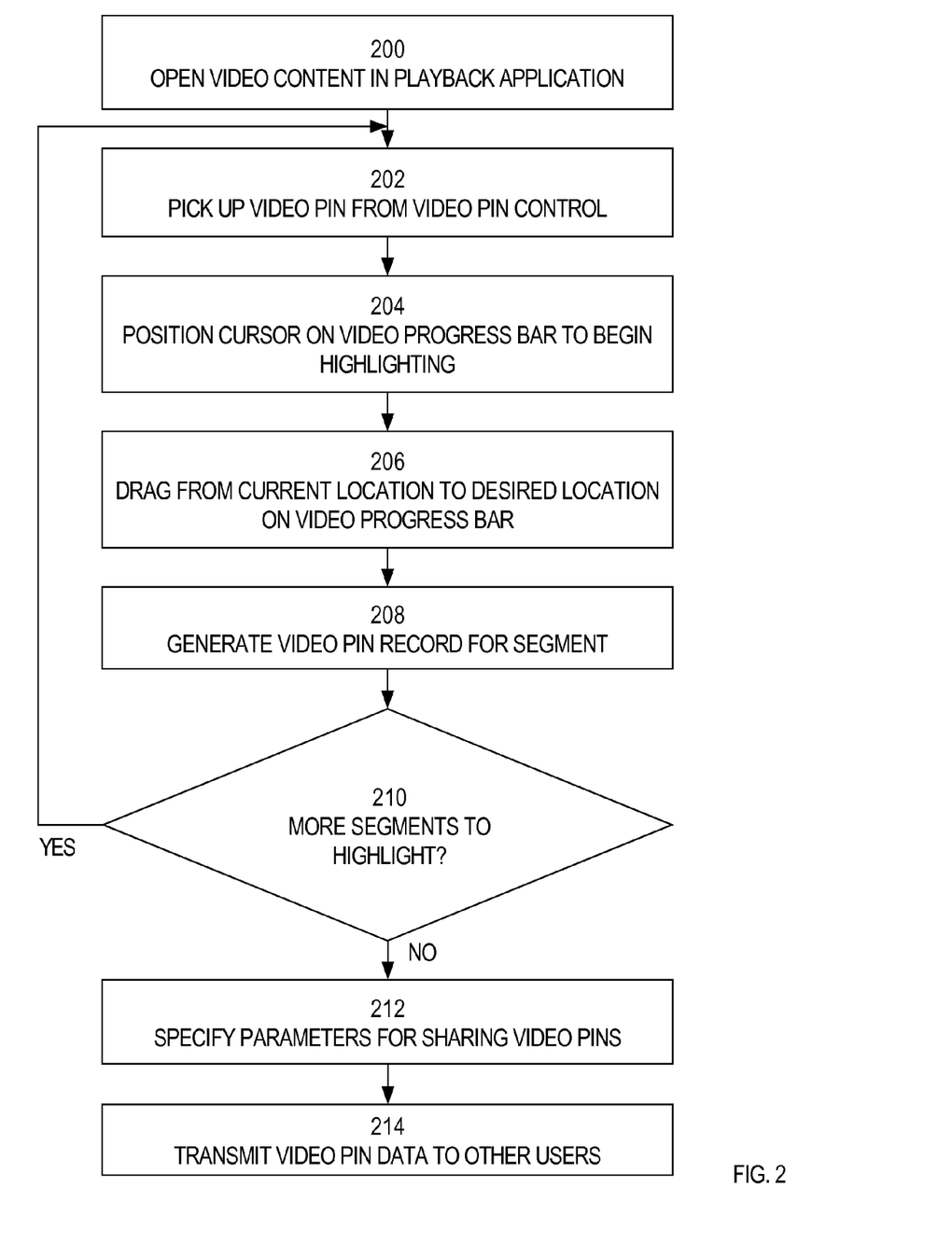
FIG. 2 is a flowchart illustrating steps for sharing video pin information according to an embodiment.

Referring to FIG. 2, it is a flowchart illustrating steps for sharing video pin information according to an embodiment. At step 200, a user opens video content in a playback application. As mentioned above, the video content may be a video file or a video stream. Through an API of the playback application, the video pin application obtains information about the video content, including the duration of the video content. The video pin application thus establishes a mapping between locations on progress bar 108, and time offsets into the loaded video.

At step 202, the user "picks up" a video pin from video pin control 104. Picking up a video pin may involve initiating a drag operation that drags a video pin indicator from video pin control 104. At step 204, the user positions the cursor on the video progress bar 108 to begin highlighting. At step 206, the user drags from the location specified in step 204 to a desired location, and then ends the drag operation.

At step 208, in response to ending to drag operation, a video pin record is generated for the segment whose boundaries are (a) the position specified in step 204, and (b) the desired location to which the cursor was dragged in step 206.

Step 210 forms a loop in which steps 202 to 208 are repeated for each segment of the video that the user wants to highlight. After the user has finished highlighting segments, at step 212 the user specifies parameters for sharing the video pins.

To assist the user in specifying sharing parameters, the video pin application may present the user with any number of sharing controls. In the embodiment illustrated in FIG. 1, the video pin application includes sharing controls 114, 116 and 118. Sharing control 114 generally represents a drop-down menu in which a user may select recipients from a list. Sharing control 116 generally represents a text field in which a user may specify recipients by entering email addresses (separated by commas if more than one is specified). Sharing control 118 provides buttons through which the user may share the video pin information with the user's friends within various social network systems.

Controls 114, 116 and 118 are merely representative of the virtually limitless number and type of controls that may be provided to facilitate the sharing of video pin information. The techniques described herein are not limited to any particular type of sharing control, nor any particular type of recipient. The recipients may be, for example, user groups, or specific websites, or other online services. Regardless of how the recipients were specified, at step 214 the video pin application transmits the video pin data to the specified users. Step 214 may be triggered, for example, by the user activating the "share now" button 106.

Video Share Records

The information that is transmitted to others when a user uses the video pin application to share video pin data is collectively referred to herein as a video share record. A video share record may include any number of metadata items in addition to the video pin records themselves. For example, in one embodiment, the video share record includes:

Information about the source of the video
The video format type
The duration of the video
The size of the video (e.g. in bytes)
The preferred player type for the video
The list of video pin records
A list of distinct users (e.g. the specified recipients)

These metadata items are merely examples of the type of information that the video share record may contain. In general, the video pin application may include in the video share record any information, obtainable by the video pin application, which may be useful to the recipients of the video share record. For example, the metadata within a video share record may include, for one or more of the video pin records, data that indicates a label, comment, or tag that the user created for the corresponding video pin record. Thus, for one video pin record that user may have specified the label "funny part". For another video pin record that corresponds to a highlighted segment, the user may have specified the comment "skip this part—boring".

Labels, comments and tags are merely examples of types of information that may be specified by the user that generates a video share record. This information, when conveyed to a recipient as part of the video share record, may be displayed to the recipient by the video pin application running on the recipient's device. For example, the recipient's device may display each highlighted segment on a timeline, along with any labels, tags and comments that were specified for the segment.

The video pin application of the recipient may also provide the recipient with the same video pin controls that were available to the user that initially created the video share record. According to one embodiment, the recipient may use those controls to specify additional points or segments of the video. The video pin records generated by the recipient may be added to the list of video pin records within the video share record. In addition, any additional labels, tags and comments may be added to the video share record. Thus, a single video share record may encapsulate information from any number of users, where each user is able to add to and re-share the video share record with others.

In an embodiment where video share records contain information generated by multiple users, the video share record may further include metadata to indicate the users that generated each piece of metadata. For example, the metadata may include information that identifies the user that generated each video pin record, label, tag, and comment.

In one embodiment, the video pin application allows a user to filter the information of a video share record based on who created the content. For example, if a particular share record includes video pin records, labels, tags and comments from ten distinct users, a user may specify that the progress bar only display pins, labels, tags and comments for a selected subset of the ten users. Thus, information that originated from users that are less-interesting to the recipient of a video share record may be filtered from the display generated by the video pin application for that recipient.

The video share record may also include a copy of the video pin application itself, or a link that may be selected to download the video pin application over a network. By including the video pin application or a link thereto within the video share record, the sender of the video share record can be ensured that the recipients will be able to make use of the video share record.

Recipient's Display

According to one embodiment, the display of a recipient of a video share record may include many of the same controls that are presented to the creator of a video share record, as illustrated in FIG. 1. Specifically, the video pin application running on the recipient's device, upon receiving and/or loading a video share record, may cause display of the video pin control 104, and sharing controls 114, 116 and 118. In addition, based on the information, about the video, that is contained in the video share record, the video pin application may launch the "preferred" video player, initiate playback of the video from the source, and generate the progress bar 108.

In addition, the video pin application may display video pins on the progress bar 108 based on the video pin records in the video share record. The location of the pins is based on both the information in the video pin records and the total duration of the video, as specified in the video share record. In addition to the video pins themselves, the recipient's user interface may also display any label, tags and comments associated with the pins.

Using video pin control 104, a recipient may add further video pins to the video share record of the video. In one embodiment, recipients may add video pins in the same manner as the original creator of the video share record. As mentioned above, each pin record may be tagged with metadata that identifies the user that created the video pin, thus allowing recipients to filter, by user, which video pins are displayed to them.

Using controls 114, 116 and 118, a recipient may further share the video share record with other users. For example, the original creator of the video share record may have shared the video share record with her "friends" in a particular social network, and the recipient may further share the video share record with his "friends" in the same social network, or an entirely different social network.

According to one embodiment, when a recipient interacts with progress bar 108, the video pin application sends commands to the API of the playback application that is playing the video in video display region 102. The commands, and the interaction that triggers them, may vary from implementation to implementation. For example, in one embodiment, when a user selects a video pin on progress bar 108, the video pin application sends a command to the playback application to cause playback of the video to jump to the location, within the video, that corresponds to the selected video pin.

As another example, the user may select a segment that is between a start-segment video pin and an end-segment video pin. In response to selection of the segment, the video pin application may send a command to cause the video player to repeatedly play the portion of the video that corresponds to the segment.

These are merely examples of the virtually unlimited ways in which the video pin application may control the playback of the video based on the user's interactions with the controls. The techniques herein are not limited to any particular type of interactions or controls.

In an alternative embodiment, the application used by recipients to make use of video share records is different than the video pin application used to create the video share records. For example, video share records may be used by a lightweight application that merely launches a playback application and displays the progress bar, video pins, and any labels, tags or comments that are associated with the video pins. Such an application need not present any controls for adding further pins, or for further sharing the video share record with others.

Back-End Processing

Instead of being processed by an application installed on the client device of a recipient, the video share message may be sent to a back-end service for processing. The back-end service may process the video share information in any number of ways. For example, the back-end service may, for each segment identified in the video share record, generate a link which, when activated, causes a playback application to play to segment. After having generated a link for each segment identified in the video share record, the back-end service may send each recipient a message with the links. The message may also include, for each link, the labels, tags and comments that the video share record's creator specified for each of the segments.

As another example, rather than send a message containing the links, the back-end processing service may post a message that contains the links to a designated social network service, on behalf of the video share record's creator. Thus, the video share record's creator's friends will receive notification of the message through the alert mechanisms that are native to the social network.

In yet another embodiment, the back-end service may maintain an account for each user. For each user, the back-end service may generate, for each video share record that has been created by the user, a page that has information generated from the video share record. The page may contain, for example, the name of the video, links to each segment, and the labels, tags and comments specified for each segment. When the user submits a newly created video share record to the service, the back-end service stores the video share record in association with the user's account. In addition, the service may send, to the designated recipients, a message that invites the recipients to view the page (which may be dynamically generated by the service), for that video share record.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
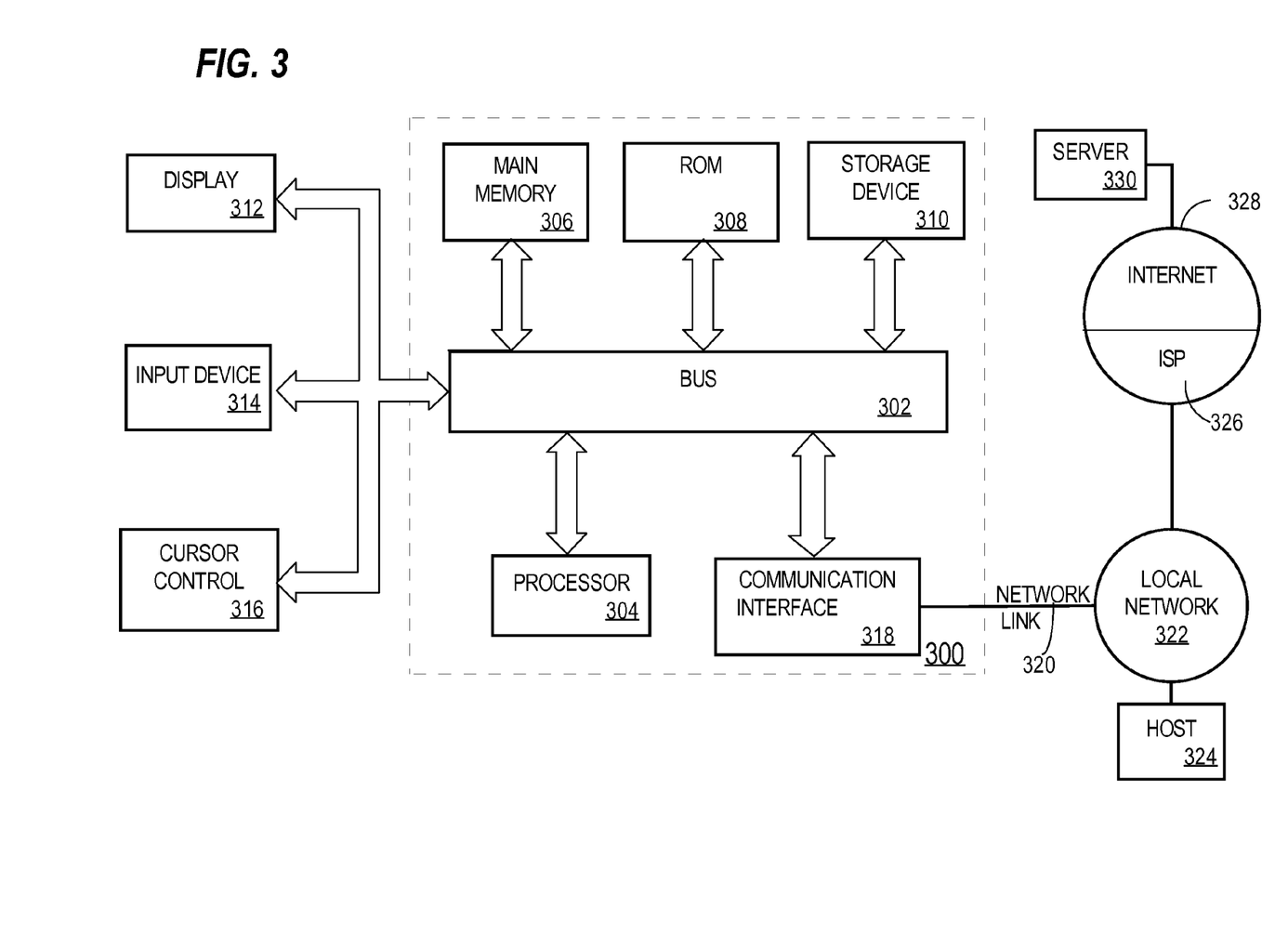
FIG. 3 is a block diagram of a computer system upon which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
a video pin application generating a graphical user interface (GUI) comprising first set of controls;
displaying the GUI in visual association with display of a video that is loaded in a video playback application;
wherein the video pin application executes separately from the video playback application;
receiving user interaction with the first set of controls generated by the video pin application;
the video pin application requesting information, about the video, from the video playback application via an application programming interface (API);
after requesting information about the video, the video pin application receiving particular video information, comprising metadata of the video, from the video playback application;
in response to the user interaction with the first set of controls generated by the video pin application:
determining by the video pin application, based at least in part on the received particular video information, that the user interaction corresponds to a particular portion of the video that is loaded in the video playback application; and
the video pin application storing metadata that identifies the particular portion of the video that is loaded in the video playback application; and
the video pin application causing one or more aspects of the metadata to be shared, over a network, with one or more users;
wherein the method is performed by one or more computing devices.

2. The method of claim 1, further comprising:
receiving, via the GUI, one or more metadata items pertaining to the particular portion of the video;
storing, in the metadata, the one or more metadata items;
wherein the one or more metadata items comprise one or more of labels, tags or comments associated with the particular portion of the video.

3. The method of claim 1 wherein the metadata includes an indication of a preferred playback application for the video.

4. The method of claim 1 wherein causing the one or more aspects of the metadata to be shared includes:
the video pin application receiving user input that designates one or more email addresses; and
the video pin application sending the metadata by email to the one or more email addresses.

5. The method of claim 1 wherein causing the one or more aspects of the metadata to be shared includes:
the video pin application receiving user input that designates one or more social networks; and
the video pin application causing the metadata to be posted to the one or more social networks.

6. The method of claim 1 wherein causing the one or more aspects of the metadata to be shared includes:
sending the metadata to a back-end service; and
the back-end service sending messages to the one or more users to enable the one or more users to play back the video at the particular portion of the video.

7. The method of claim 1 further comprising:
wherein the particular portion of the video indicates one or more of: specific points or segments of the video;
enabling a user, of the one or more users, to specify one or more additional points or segments of the video; and
adding, to the metadata, information that identifies the one or more additional points or segments.

8. The method of claim 2 further comprising:
enabling a user, of the one or more users, to specify one or more additional labels, tags or comments associated with the particular portion of the video; and
adding, to the metadata, information that identifies the one or more additional labels, tags or comments.

9. The method of claim 1 wherein:
the first set of controls includes a progress bar;
the particular portion of the video indicates one or more of: specific points or segments of the video; and
the user interaction with the first set of controls includes associating one or more video pin indicators with one or more specific points on the progress bar to specify the specific points or segments.

10. The method of claim 9 wherein the first set of controls includes:
controls for associating a point-in-time video pin indicators with specific points on the progress bar, and
controls for associating segment video pin indicators with specific segments of time on the progress bar.

11. The method of claim 1 further comprising an application on a client device of a user, of the one or more users, performing the steps of:
reading the metadata received over the network;
based on the metadata, causing
a second video playback application to load the video; and
display of controls for causing the second video playback application to jump to the particular portion of the video.

12. The method of claim 1 further comprising:
the video pin application receiving, via the first set of controls generated by the video pin application, a first designated location; and
in response to receiving the first designated location, the video pin application causing the video playback application to jump in the video that is loaded in the video playback application, to the first designated location.

13. The method of claim 12 wherein causing the video playback application to jump to the first designated location comprises the video pin application sending a command, to the video playback application via the application programming interface, to jump to a portion of the video indicated by the first designated location.

14. The method of claim 1 further comprising:
receiving, by the video pin application, a duration of the video via the API;
the video pin application determining a time offset, for the particular portion of the video, based, at least in part, on the received duration of the video; and
storing the time offset as at least part of the metadata that identifies the particular portion of the video.

15. The method of claim 1 further comprising:
providing the first set of controls generated by the video pin application, instead of a second set of controls generated by the video playback application.

16. One or more non-transitory computer-readable media storing one or more sequences of instructions comprising instructions which, when executed by one or more processors, cause:
a video pin application generating a graphical user interface (GUI) comprising first set of controls;
displaying the GUI in visual association with display of a video that is loaded in a video playback application;
wherein the video pin application executes separately from the video playback application;
receiving user interaction with the first set of controls generated by the video pin application;
the video pin application requesting information, about the video, from the video playback application via an application programming interface (API);
after requesting information about the video, the video pin application receiving particular video information, comprising metadata of the video, from the video playback application;
in response to the user interaction with the first set of controls generated by the video pin application:
determining by the video pin application, based at least in part on the received particular video information, that the user interaction corresponds to a particular portion of the video that is loaded in the video playback application; and
the video pin application storing metadata that identifies the particular portion of the video that is loaded in the video playback application; and
the video pin application causing one or more aspects of the metadata to be shared, over a network, with one or more users.

17. The one or more non-transitory computer-readable media of claim 16, wherein the one or more sequences of instructions further comprise instructions which, when executed by one or more processors, cause:
receiving, via the GUI, one or more metadata items pertaining to the particular portion of the video;
storing, in the metadata, the one or more metadata items;
wherein the one or more metadata items comprise one or more of labels, tags or comments associated with the particular portion of the video.

18. The one or more non-transitory computer-readable media of claim 16, wherein causing the one or more aspects of the metadata to be shared comprises:
sending the metadata to a back-end service; and
the back-end service sending messages to the one or more users to enable the one or more users to play back the video at the particular portion of the video.

19. The one or more non-transitory computer-readable media of claim 16, wherein the one or more sequences of instructions further comprise instructions which, when executed by one or more processors, cause:
receiving, by the video pin application, a duration of the video via the API;
the video pin application determining a time offset, for the particular portion of the video, based, at least in part, on the received duration of the video; and
storing the time offset as at least part of the metadata that identifies the particular portion of the video.

20. The one or more non-transitory computer-readable media of claim 16, wherein the one or more sequences of instructions further comprise instructions which, when executed by one or more processors, cause:
the video pin application receiving, via the first set of controls generated by the video pin application, a first designated location; and
in response to receiving the first designated location, the video pin application causing the video playback application to jump in the video that is loaded in the video playback application, to the first designated location.

21. The one or more non-transitory computer-readable media of claim 16, wherein the metadata includes an indication of a preferred playback application for the video.

22. The one or more non-transitory computer-readable media of claim 16, wherein causing the one or more aspects of the metadata to be shared includes:
the video pin application receiving user input that designates one or more email addresses; and
the video pin application sending the metadata by email to the one or more email addresses.

23. The one or more non-transitory computer-readable media of claim 16, wherein causing the one or more aspects of the metadata to be shared includes:
the video pin application receiving user input that designates one or more social networks; and
the video pin application causing the metadata to be posted to the one or more social networks.

24. The one or more non-transitory computer-readable media of claim 16, wherein the one or more sequences of instructions further comprise instructions which, when executed by one or more processors, cause:
    wherein the particular portion of the video indicates one or more of: specific points or segments of the video;
    enabling a user, of the one or more users, to specify one or more additional points or segments of the video; and
    adding, to the metadata, information that identifies the one or more additional points or segments.

25. The one or more non-transitory computer-readable media of claim 17, wherein the one or more sequences of instructions further comprise instructions which, when executed by one or more processors, cause:
    enabling a user, of the one or more users, to specify one or more additional labels, tags or comments associated with the particular portion of the video; and
    adding, to the metadata, information that identifies the one or more additional labels, tags or comments.

26. The one or more non-transitory computer-readable media of claim 16, wherein:
    the first set of controls includes a progress bar;
    the particular portion of the video indicates one or more of: specific points or segments of the video; and
    the user interaction with the first set of controls includes associating one or more video pin indicators with one or more specific points on the progress bar to specify the specific points or segments.

27. The one or more non-transitory computer-readable media of claim 26, wherein the first set of controls includes:
    controls for associating a point-in-time video pin indicators with specific points on the progress bar, and
    controls for associating segment video pin indicators with specific segments of time on the progress bar.

28. The one or more non-transitory computer-readable media of claim 16, wherein the one or more sequences of instructions further comprise instructions which, when executed by one or more processors, cause an application on a client device of a user, of the one or more users, performing the steps of:
    reading the metadata received over the network;
    based on the metadata, causing
        a second video playback application to load the video; and
        display of controls for causing the second video playback application to jump to the particular portion of the video.

29. The one or more non-transitory computer-readable media of claim 20, wherein causing the video playback application to jump to the first designated location comprises the video pin application sending a command, to the video playback application via the application programming interface, to jump to a portion of the video indicated by the first designated location.

30. The one or more non-transitory computer-readable media of claim 16, wherein the one or more sequences of instructions further comprise instructions which, when executed by one or more processors, cause:
    providing the first set of controls generated by the video pin application, instead of a second set of controls generated by the video playback application.

\* \* \* \* \*